US007040007B2

(12) United States Patent
Shutts et al.

(10) Patent No.: US 7,040,007 B2
(45) Date of Patent: May 9, 2006

(54) CRIMPING TOOL FOR CONNECTING A MODULAR PLUG CONNECTOR

(75) Inventors: Leslie B. Shutts, Ruther Glen, VA (US); Yin Ho Cheng, Taipai Hsien (TW); Huang De Sei, Taipai Hsien (TW)

(73) Assignee: Connectool Inc., Oilville, VA (US)

( * ) Notice: Subject to any disclaimer, the term of this patent is extended or adjusted under 35 U.S.C. 154(b) by 477 days.

(21) Appl. No.: 10/408,239

(22) Filed: Apr. 8, 2003

(65) Prior Publication Data

US 2004/0200060 A1 Oct. 14, 2004

(51) Int. Cl.
*B23P 19/00* (2006.01)
*H01R 43/042* (2006.01)
*B26B 7/00* (2006.01)

(52) U.S. Cl. ............................ 29/751; 29/750; 29/747; 29/753; 29/758; 29/761; 81/300

(58) Field of Classification Search .................. 29/751, 29/750, 753, 758, 761, 747; 81/300, 304, 81/306; 100/234, 243
See application file for complete search history.

(56) References Cited

U.S. PATENT DOCUMENTS

| | | | | |
|---|---|---|---|---|
| 4,899,445 A | | 2/1990 | Erbrick et al. | |
| 5,012,666 A | * | 5/1991 | Chen et al. | 72/409.01 |
| 5,236,331 A | * | 8/1993 | Liu | 72/461 |
| 5,402,561 A | * | 4/1995 | Cerquone et al. | 29/751 |
| 5,845,393 A | * | 12/1998 | DePaiva | 29/751 |
| 6,109,088 A | * | 8/2000 | Schrader et al. | 72/409.16 |
| 6,138,346 A | | 10/2000 | Shutts et al. | |

OTHER PUBLICATIONS

Paladin Tools 2001 Catalog, pp. 48-52, Connectool Inc., 2001.

* cited by examiner

*Primary Examiner*—A. Dexter Tugbang
*Assistant Examiner*—Tai Van Nguyen
(74) *Attorney, Agent, or Firm*—Lawrence E. Laubscher, Sr.; Lawrence E. Laubscher, Jr.

(57) ABSTRACT

A crimping tool is provided for connecting a modular plug connector with a telephone/data cable, and an axial connector with a coaxial cable, including a pair of operating arms pivotally connected intermediate their ends to define on opposite sides of the pivot axis a pair of operating end portions and a pair of crimping end portions, respectively, a pair of crimping dies being connected between the crimping end portions and containing first recesses for defining a first crimping chamber adjacent the end extremities of the crimping end portions, the adjacent surfaces of the crimping dies containing opposed second recesses cooperating to define a second crimping chamber arranged between the first crimping chamber and the pivot axis of the operating arms. One of the crimping dies is a support die for supporting the modular plug connector longitudinally of the associated crimping arm portion, and the other die is an actuating die having projections for displacing first and second strain relief devices into engagement with the insulation layers of the telephone/data cable and the exposed insulated conductors thereof, respectively. The adjacent surfaces of the dies contain opposed guide devices that cooperate to align the first recesses and the second recesses, respectively, during movement of the operating arms toward their closed crimping position.

9 Claims, 5 Drawing Sheets

FIG. 10
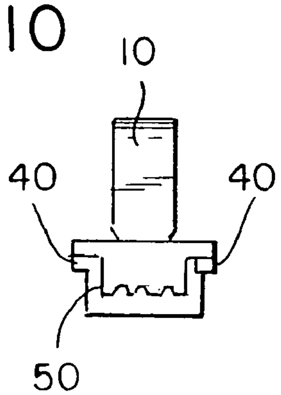
FIG. 8
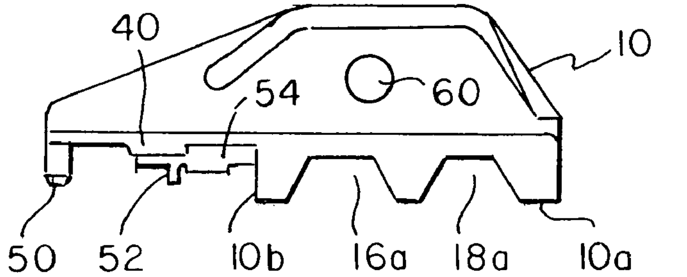
FIG. 9
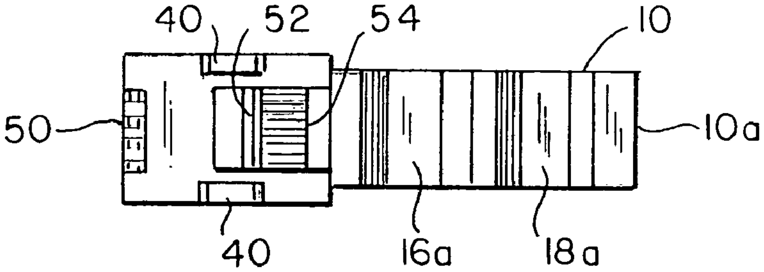
FIG. 11
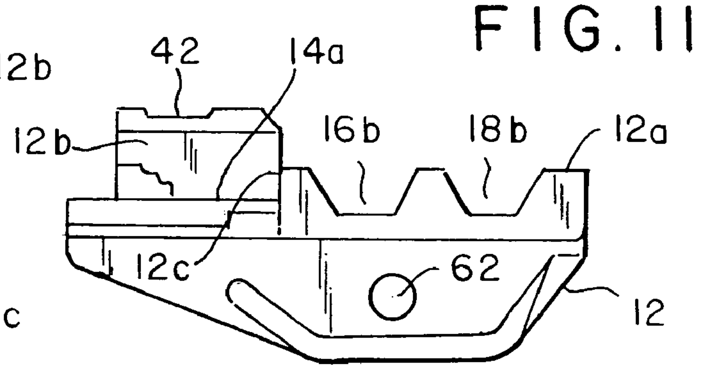
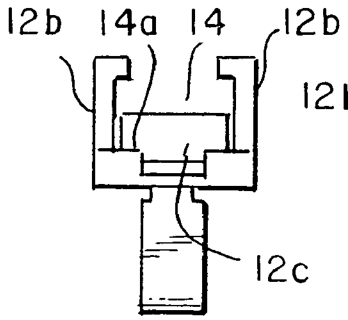
FIG. 13
FIG. 12
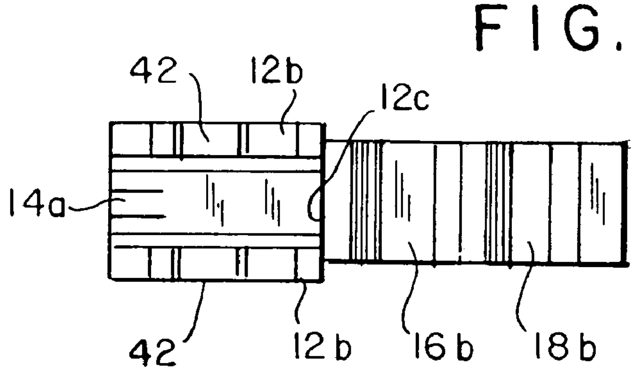

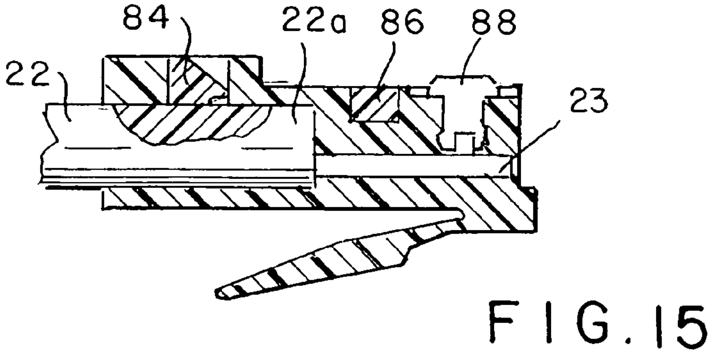
FIG. 15
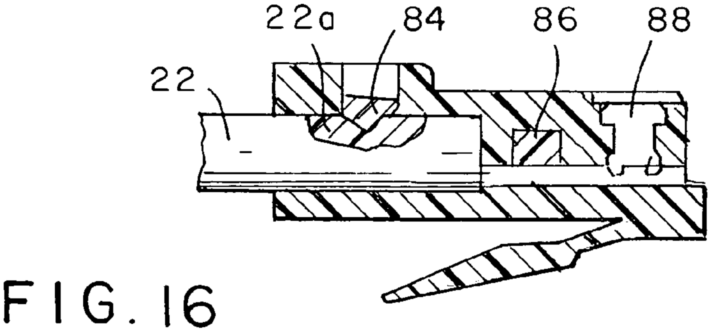
FIG. 16
FIG. 17
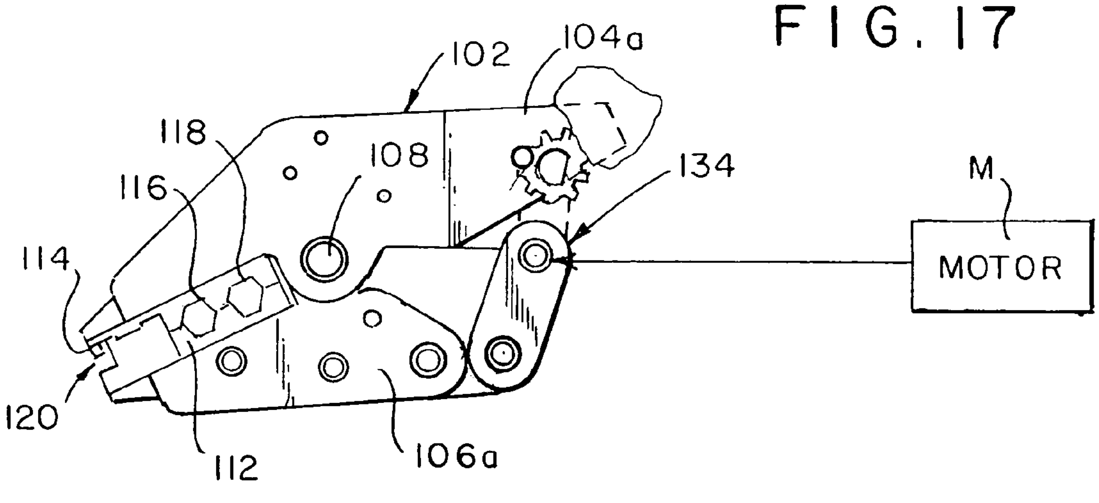

CRIMPING TOOL FOR CONNECTING A MODULAR PLUG CONNECTOR

BACKGROUND OF THE INVENTION

1. Field of the Invention

A crimping tool includes a pair of operating arms that are pivotally connected intermediate their ends to define on opposite sides of the pivot axis pairs of operating end portions and crimping end portions, respectively, a pair of crimping dies being connected between the crimping arm end portions, the adjacent surfaces of said crimping dies containing opposed first recesses that cooperate to define a first longitudinally expending crimping chamber adjacent the arm end extremities for receiving a generally rectangular telephone/data cable modular plug connector, and opposed second recesses that cooperate to define a second transversely extending crimping chamber for receiving a generally annular coaxial cable connector. Guide means are provided for accurately positioning the die members during pivotal movement of the operating arms toward the closed position.

2. Brief Description of the Prior Art

Motor-driven crimping tools for connecting electrical connectors to cables are well known in the patented prior art, as evidenced by the prior Shutts, et al., U.S. Pat. No. 6,138,346, which is assigned to the same assignee as the instant invention. As disclosed in the Erbrick, et al., U.S. Pat. No. 4,899,445, it is also known in the art to provide hand-operated tools with ratchet means for preventing reverse movement of operating arms when force is being applied via force-multiplying linkage means. In the Paladin Tools 1300 Series Crimpers and the CRIMPALL Series Crimpers produced by the assignee of the present invention, the hand-operated crimping tools include a fully-ratcheting cycle with built-in safety release means. Interchangeable die sets are provided for use in different coaxial, fiber optic, modular plug, terminal and wire ferrule connector applications. In order to reduce the number of die sets associated with such crimping tools, the present invention was developed, whereby two totally different types of connectors—namely, rectangular modular plug connectors for telephone/data cables, and annular coaxial connectors for shielded coaxial cables—can be connected with the associated cable by the use of a single crimping tool.

SUMMARY OF THE INVENTION

Accordingly, a primary object of the present invention is to provide a crimping tool having a die set operable to crimp both modular plug connectors and coaxial connectors to the associated telephone/data and shielded coaxial cables, respectively. The dies are connected between the crimping ends of a pair of operating arms that are pivotally connected intermediate their ends, a first crimping chamber being defined by first recesses at the free ends of the dies for longitudinally receiving a modular plug connector that is to be fastened to a longitudinally extending telephone/data cable. Oppositely arranged second recesses define a second crimping chamber arranged between the first crimping chamber and the pivot axis of the operating arms, said second crimping chamber extending transversely for crimped connection to a transversely arranged coaxial cable. Guide means are provided on the dies for accurately positioning the same during pivotal movement of the operating arms of the tools in the closed crimping direction.

According to a more specific object of the invention, one die is a support die having a flat surface for supporting the longitudinally arranged modular plug, and the other die includes longitudinally spaced first and second crimping projections for displacing primary and second strain relief devices into engagement with the insulation layers of the cable and the conductors, respectively. The die guide means include a pair of spaced guide projections arranged adjacent the remote sides of the second crimping projection for cooperation with corresponding guide grooves contained in the other die, respectively. Preferably the guide projections and guide recesses have converging inclined cooperating guide surfaces, respectively. Releasable ratchet means may be provided for preventing pivotal movement of the operating arms in the opposite opening direction. Pins may be provided on the actuating die for displacing insulation displacement contacts into insulation-piercing engagement with the electrical conductors, respectively.

The die set of the present invention encompasses a special extended die design affording multiple-application terminations of connectors by the use of a single crimping tool. Unlike conventional die sets that are single-application and single-media types, the combination die set allows for two different application types with two media types—namely, telephone/data cable termination, and coaxial cable termination.

According to a more specific object of the invention, the front end of the die set is extended to allow placement of a modular plug crimping area. Modular plugs, which are used for telephone and data network cabling and installation, require a lower amount of crimp force to terminate the insulation displacement contacts that pierce the conductor insulation for electrical engagement with the wire conductor. The special design of the die set allows for the force delivered by the crimping tool to focus on the insulation displacement contact pins and the strain relief devices to insure proper termination. In conventional die sets, the modular plug crimp area is located near the back center of the die set to achieve the same results. Also, conventional die sets are single function devices and allow for only terminating modular plugs and no other connector system.

According to another object of the invention, the die set contains hexagonal crimping areas cable television cables with shielded coaxial cables used primarily in television and satellite broadcasting. The hexagonal crimp areas are located in the back of the die set, allowing focusing of maximum crimp force onto the coaxial connectors. Conventional die sets provide the crimp areas in the middle of the die set.

BRIEF DESCRIPTION OF THE DRAWINGS

Other objects and advantages of the invention will become apparent from a study of the following specification when viewed in the light of the accompanying drawings, in which:

FIGS. 8–10 are side, bottom and left hand end views of the actuating die of FIG. 6, and FIGS. 11–13 are side, top and left hand end views of the support die of FIG. 7;

FIGS. 15 and 16 illustrate the modular plug connector before and after the primary and secondary strain relief members are displaced into crimped engagement with the insulation layers of the modular plug and the conductors, respectively; and FIG. 17 is a diagrammatic illustration of a motor-driven crimping tool using the die set of the present invention.

DETAILED DESCRIPTION

Figures 1, 1A, 1B:
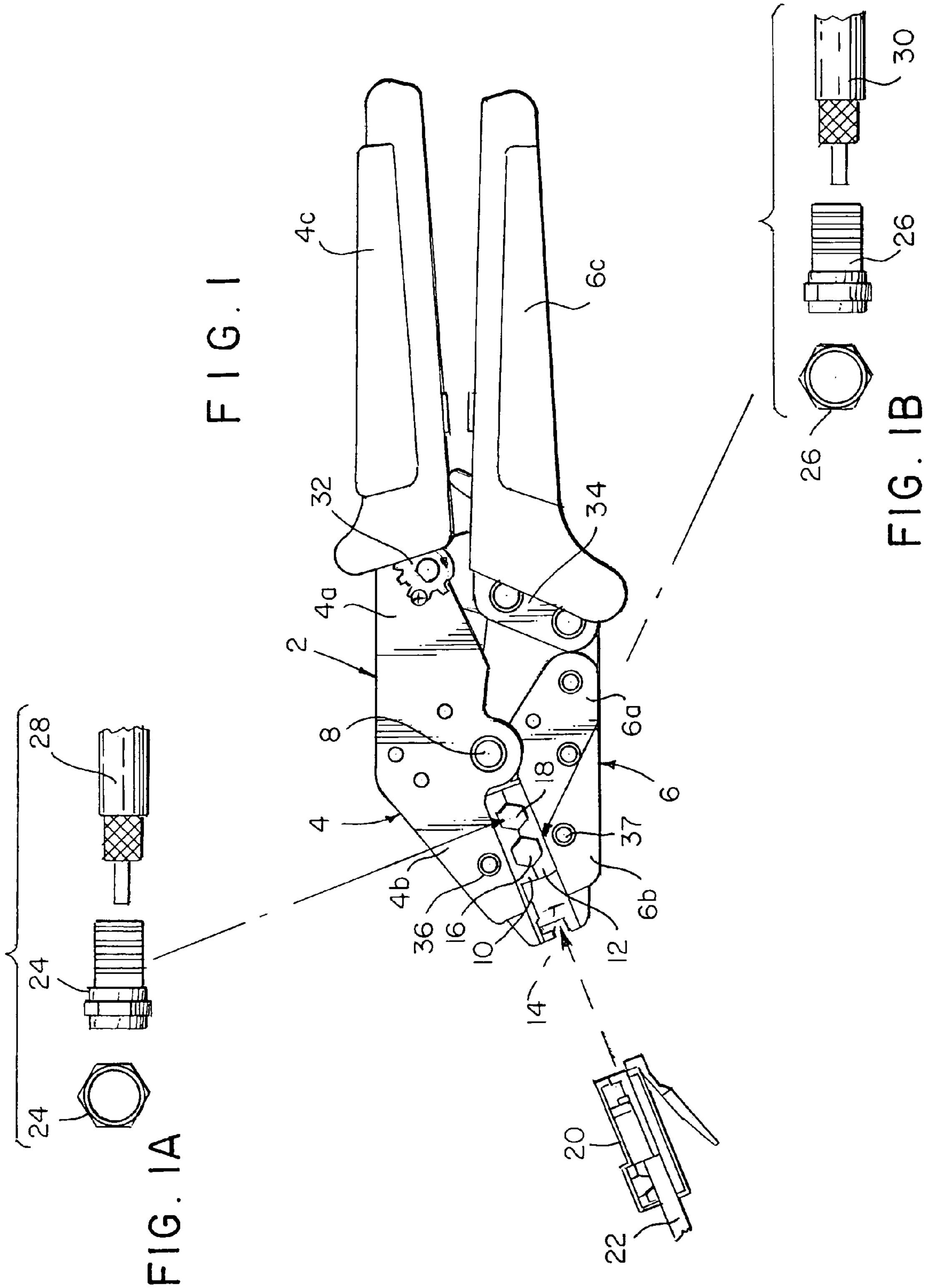
FIG. 1 is a side elevation view of the crimping tool, illustrating the connectors and cables that are to be crimped by means of the tool.
FIGS. 1A and 1B are end views of the coaxial connectors of FIG. 1.

Referring more particularly to FIG. 1, the hand-held crimping tool 2 of the present invention includes a pair of operating arms 4 and 6 that are pivotally connected intermediate their ends by a pivot pin 8, thereby defining a pair of operating end portions 4*a* and 6*a*, and a pair of crimping end portions 4*b* and 6*b*, respectively. Mounted on the adjacent faces of the crimping end portions are a pair of crimping dies 10 and 12 that cooperate to define a longitudinally-extending first crimping chamber 14, and transversely-extending second and third crimping chambers 16 and 18, respectively. The first crimping chamber 14 is adapted to receive a generally rectangular modular plug connector 20 that is to be crimped to a telephone/data cable 22, and the second and third crimping chambers 16 and 18 have hexagonal cross-sectional configurations and are adapted to receive generally cylindrical coaxial connectors 24 and 26 that are to be crimped to coaxial cables 28 and 30, as is known in the art. In the illustrated embodiment, the handle arm portions 4*a* and 6*a* are provided with manually-operable hand grip operating portions 4*c* and 6*c*, respectively. As is known in the art, releasable ratchet means 32 and force-multiplying linkage means 34 may be connected between the arm operating portions 4*a* and 6*a*. The dies are releasably connected with their associated arm crimping end portions by screw means 36 and 37 respectively.

Figure 2:
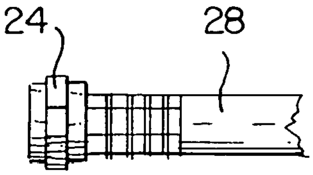
FIGS. 2 and 3, and FIGS. 4 and 5 are side and end views of the crimped coaxial connectors of FIG. 1.
Figure 3:
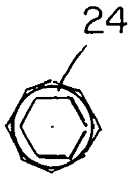
Figure 4:
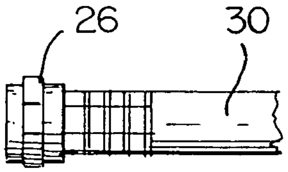
Figure 5:
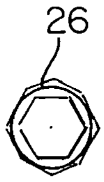

The arms 4 and 6 are pivotally displaceable between an open released position and the closed crimping position illustrated in FIG. 1. FIGS. 2 and 3 illustrate the hexagonal crimping effect that is produced when the annular coaxial connector 24 is transversely positioned in the second crimping bore and is crimped by the dies 11 and 12 as the arms 4 and 6 are pivoted to the closed position. Similarly, FIGS. 4 and 5 illustrate the hexagonal crimping connection between the transversely-arranged coaxial connector 26 arranged in the third crimping chamber 18 to the transversely arranged coaxial cable 30.

Figure 6:
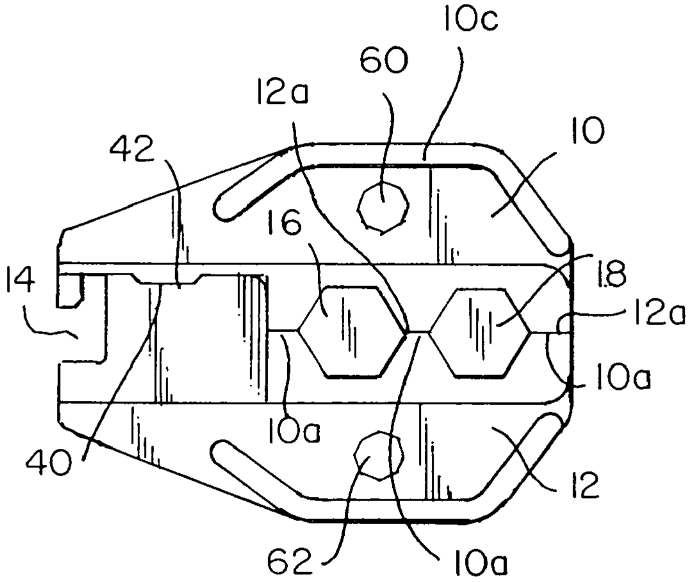
FIGS. 6 and 7 are side and left hand end views, respectively, of the die set of the present invention when in the closed position.
Figure 7:
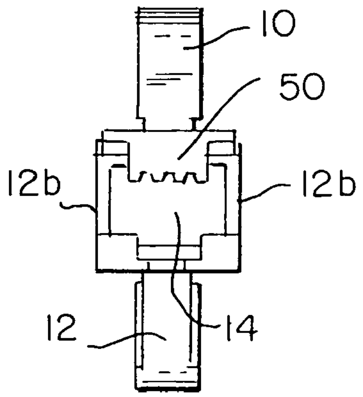

In accordance with an important feature of the invention best shown in FIG. 6, the crimping dies 10 and 12 include horizontal stabilizing surfaces 10*a* and 12*a* that contain recesses that define the second and third clamping chambers 16 and 18, which stabilizing surfaces 10*a* and 12*a* are in abutting engagement when the dies are in their closed crimping position. Furthermore, guide projections 40 on the actuating die engage corresponding guide grooves 42 contained in vertical support wall portions of the support die 12, for accurately relatively positioning the dies, as will be explained in greater detail below.

Referring now to FIGS. 8–10, the upper die is an actuating die having longitudinally spaced downwardly projecting first and second actuating projections 50 and 52, respectfully, and a row of longitudinally extending ribs 54 on the opposite side of said second projection 52 relative to said first projection 50. The horizontal bottom wall 10*a* of the upper die member contains a pair of recesses 16*a* and 18*a* that define the upper halves of the second and third crimping chambers 16 and 18 of FIG. 6, respectively. On opposite sides of the second actuating projection 52, the die contains a pair of downwardly extending guide projections 40 and 42 having inclined end wall. The body portion of the upper die contains a through bore 60 that receives the upper fastening screw means 36 of FIG. 1. An engraved rib portion may be provided that stabilizes the die relative to the recess of the arm end portion 4*a* within which it is mounted.

Similarly, the lower die 12 is a support die having a horizontal upper surface contain recesses 16*b* and 18*b* that define the lower halves of the second and third crimping chambers 16 and 18, respectively. The die includes a pair of upwardly extending side wall portions 12*b* that define the vertical side walls of the first crimping chamber 14. The first crimping chamber has a flat horizontal bottom wall 14*a* that defines the support surface for supporting the modular plug connector 20 during the crimping thereof. The rear wall of the first crimping chamber is defined by cooperating vertical transverse walls 10*b* and 12*c* on the upper and lower dies, respectively. Guide grooves 42 are provided in the upper surfaces of the vertical wall portions 12*b* opposite the guide projections 40 on the upper die, respectively. The guide projections and grooves have corresponding inclined converging guide surfaces that accurately position the die members relative to each other as the cooperating arms are pivotally displaced together during each crimping operation. The lower die 12 contains a through bore 62 for receiving the fastening screw 37 of FIG. 1.

Figure 14:
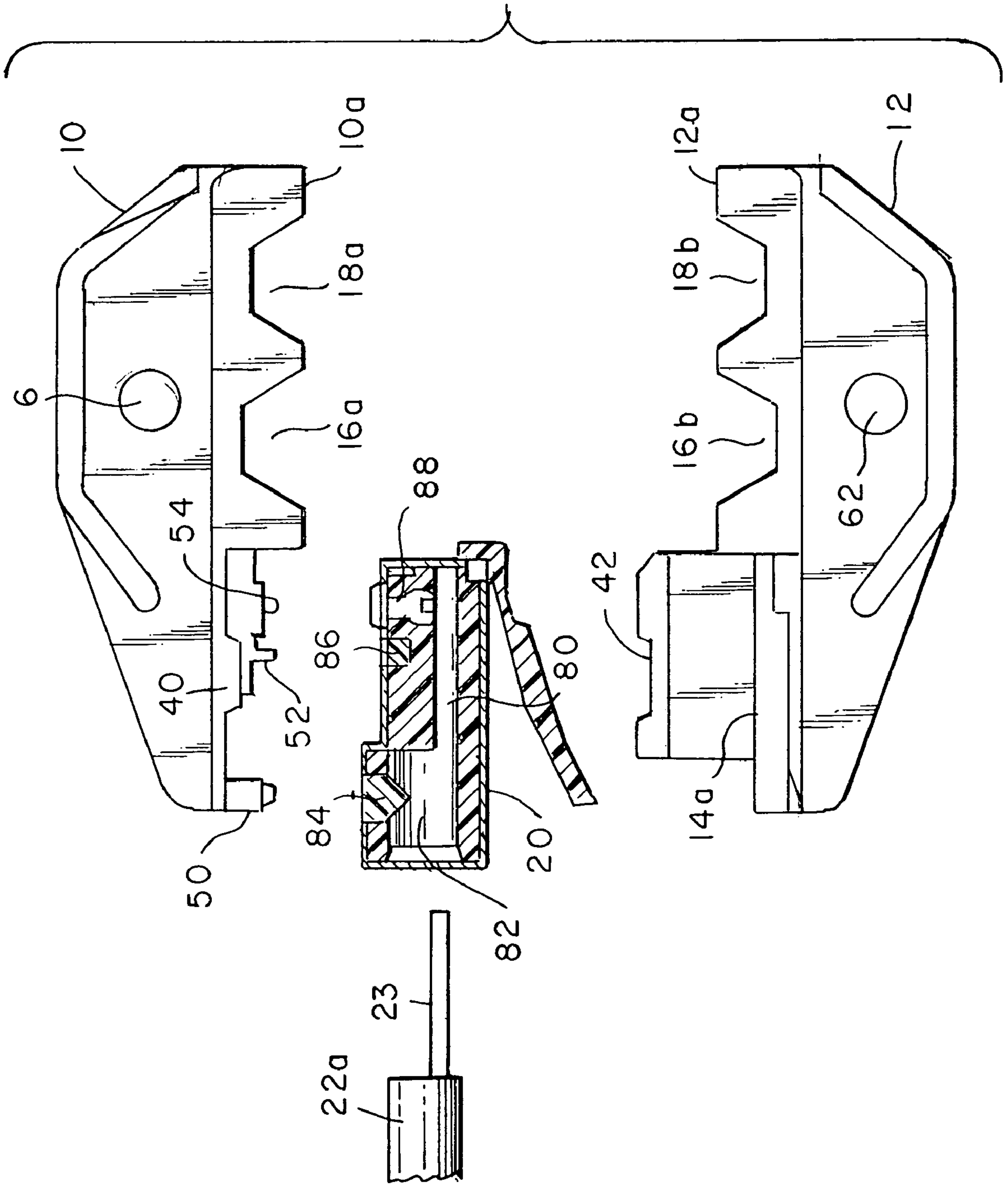
FIG. 14 is an exploded view illustrating the arrangement of the modular plug connector and associated cable relative to the support and actuating dies of the present invention.

Referring now to FIGS. 14–16, in order to crimp a modular plug connector 20 to a multi-conductor telephone/data cable 22, the cable end portion is inserted completely within the recess 82 defined in the adjacent end of the plug connector body, and the plurality of exposed insulated conductors are inserted within the bores 23, respectively, as shown in FIG. 15. As is known in the art, the modular plug connector is provided with transversely extending primary and secondary strain relief devices 84 and 86 opposite the recess 82 and the through bores 80. The first and second projections 50 and 52 on the upper die 4 are opposite the primary and secondary strain relief members 84 and 86, respectively. Associated with each of the through bores is an insulation displacing contact 88 that is axially displaceable to pierce the insulation of the associated conductor and to electrically engage the same. The parallel ribs 54 are opposite the contacts 88, respectively. As the operating arms are pivoted to close the dies together, the first and second projections 50 and 52 engage the primary and secondary strain relief devices 84 and 86 and displace the same into engagement with the insulation layers of the cable and the conductors, respectively, thereby to fasten the connector to both the cable and to the conductors as shown in FIG. 16. Simultaneously, the insulation displacing contacts 88 are displaced by the ribs 54 into insulation-piercing electrical engagement with the conductors, respectively. During the displacement of the dies together toward the closed position, the inclined guide surfaces on the guide projections 40 engage the corresponding inclined guide surfaces on the guide grooves 42, thereby to accurately position the dies relative to each other.

Similarly, each of the coaxial connectors 24 and 26 can be crimped to the corresponding coaxial cables 28 and 30, respectively, by pivoting the operating arms to the closed position. The location of the hexagonal crimp areas on the back of the die adjacent the pivot axis of the tool applies the maximum crimp force to the coaxial connectors. The connectors may be of the RG6 and RG6 connectors of the F-type for use with quad shielded-cable television or of the BNC, TNC, N-type, SMA, SMB, Mini-UHF type, and the like. The shielded coaxial cable can be of the single, dual, quad, triaxial and screened types, as desired.

While the illustrated crimping tool embodiment is of the manually-operable including handle portions 4*c*, 6*c*, it is apparent that the invention applies equally to a motor driven-embodiment. Thus, as shown in FIG. 17, the operating arm portions 104*a* and 106*a* can be driven by the motor M via the force amplifying linkage means 134 in a manner similar to that of the aforementioned Shutts, et al., U.S. Pat. No. 6,138,346.

While in accordance with the provisions of the Patent Statutes the preferred forms and embodiments of the invention have been illustrated and described, it will be apparent to those skilled in the art that various changes and modifications may be made without deviating from the inventive concepts set forth above.

What is claimed is:

1. A crimping tool for connecting a modular plug connector with a telephone/data cable, and for connecting a coaxial connector with a shielded coaxial cable, said modular plug including a synthetic plastic body having a longitudinal axis and a generally rectangular cross-section, said body containing a row of parallel longitudinally-extending through bores, one end of said body containing a recess in communication with said through bores, said modular plug body including transversely-arranged inwardly-displaceable primary and secondary strain relief means arranged opposite said plug body recess and said bores, respectively, said telephone/data cable including a plurality of insulated conductors that extend within said through bores, respectively, and an outer insulated portion that extends within said plug body recess, comprising:

(a) a pair of operating arms pivotally connected intermediate their ends for movment about a transverse pivot axis, said operating arms having operating end portions and crimping end portions on opposite sides of said pivot axis, respectively, said arms being pivotable between open and closed positions relative to each other; and (b) a pair of crimping dies mounted on the adjacent sides of said arm crimping end portions, respectively, said crimping dies containing first recesses that cooperate when said arms are in the closed position to define a first crimping chamber that extends longitudinally of said crimping ends inwardly toward said pivot axis, said first crimping chamber terminating in a transverse end wall, (1)one of said dies comprising a support die having a fiat support surface defining a wall portion of said first crimping chamber, said support surface being operable to support the modular plug body within said first crimping chamber when said plug body is introduced, with the handle arms in the open position, into said first crimping chamber in the direction of said pivot axis and into engagement with said transverse end wall;

(2) the other of said crimping dies comprising an actuating die having first and second actuating projections extending toward said support die opposite said primary and said secondary strain relief means, respectively, said first actuating projection being spaced from said pivot axis a greater distance than said second crimping projection, whereby when said arms are pivoted together toward said closed position, said first and second projections displace said primary and said secondary strain relief means into embedded engagement with said insulated portions of said cable and said conductors, respectively;

(3) the adjacent faces of said crimping dies also containing a pair of opposed second crimping recesses that cooperate to define a transversely extending second crimping chamber when said arms are in said closed position, said second crimping chamber being arranged between said first crimping chamber and said pivot axis, said second crimping chamber being operable to crimp the coaxial connector to said shielded coaxial cable when the coaxial cable and connector are arranged transversely of said arms; and (4) guide means for accurately positioning said die members relative to each other when said arms are pivotally displaced toward said closed position, said guide means including at least one guide projection carried by one of said dies that extends within a corresponding guide recess contained within the other die when said arms are in the closed position, said guide recess and said guide projection having corresponding generally converging inclined guide surfaces, thereby to accurately position said crimping dies relative to each other when said arms are progressively displaced toward said closed position.

2. A crimping tool as defined in 1, wherein a pair of said guide projections are provided in laterally spaced relation adjacent the sides of said dies for engagement with a corresponding pair of said guide recesses, respectively.

3. A crimping tool as defined in claim 2, wherein said guide projections are arranged on opposite sides of said second crimping projection adjacent the body side walls, respectively.

4. A crimping tool as defined in claim 2, and further wherein:

(d) the adjacent surfaces of said crimping dies contain a second pair of opposed crimping recesses that cooperate to define a transversely-extending third crimping chamber between said second crimping chamber and said pivot axis, said third crimping chamber being operable to crimp a second coaxial connector to a second shielded coaxial cable, said third crimping recess having a smaller cross-sectional area than said second crimping recess, said second and third crimping chambers each having an hexagonal cross-section configuration;

(e) said dies including planar stabilizing surfaces arranged on opposite sides of said second crimping chamber, said stabilizing surfaces being in parallel abutting engagement when said operating arms are in the closed position.

5. A crimping tool as defined in claim 1, and further including means for removably connecting said crimping dies with said crimping end portions, respectively.

6. A crimping tool as defined in claim 1, wherein said modular plug includes a plurality of parallel electrically conductive insulation displacement contacts arranged in a row normal to said through holes, respectively, and further wherein said actuating die includes a plurality of actuating pins opposite said contacts for displacing the same into insulation-piercing engagement with said conductors, respectively, when said arms are displaced toward said closed position, said actuating pins being arranged between said second actuating projection and said operating arm pivot axis.

7. A crimping tool and defined in claim 1, and further including releasable ratchet means operable during pivotal movement of said operating arms toward the closed position for preventing pivotal movement of said operating arms in the opposite direction.

8. A crimping tool as defined in claim 1, wherein said operating end portions comprise handle means for manually operating the crimping tool.

9. A crimping tool as defined in claim 1, and further including force-amplifying linkage means connected between said arm operating end portions, and motor means for operating said operating arms between their open and closed positions.

* * * * *